(12) United States Patent
Carey et al.

(10) Patent No.: US 10,339,142 B2
(45) Date of Patent: *Jul. 2, 2019

(54) WINDOW MANAGEMENT IN A STREAM COMPUTING ENVIRONMENT

(71) Applicant: INTERNATIONAL BUSINESS MACHINES CORPORATION, Armonk, NY (US)

(72) Inventors: James E. Carey, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/952,396

(22) Filed: Apr. 13, 2018

(65) Prior Publication Data

US 2018/0225335 A1 Aug. 9, 2018

Related U.S. Application Data

(63) Continuation of application No. 15/699,309, filed on Sep. 8, 2017, now Pat. No. 10,007,704, which is a
(Continued)

(51) Int. Cl.
*G06F 16/2453* (2019.01)
*G06F 16/2455* (2019.01)
(Continued)

(52) U.S. Cl.
CPC .. *G06F 16/24568* (2019.01); *G06F 16/24537* (2019.01); *H04L 47/10* (2013.01); *H04L 47/27* (2013.01)

(58) Field of Classification Search
CPC ......... G06F 16/24568; G06F 16/24537; H04L 47/10; H04L 47/27
See application file for complete search history.

(56) References Cited

U.S. PATENT DOCUMENTS 7,158,479 B1 1/2007 Noble
8,233,438 B2 7/2012 Wise et al.
(Continued)

FOREIGN PATENT DOCUMENTS

WO 2017058214 A 4/2017

OTHER PUBLICATIONS

IBM, List of IBM Patents or Patent Applications Treated as Related, Appendix P, dated Apr. 19, 2018, 2 pages.
(Continued)

*Primary Examiner* — Jorge A Casanova
(74) *Attorney, Agent, or Firm* — Anthony R. Curro

(57) ABSTRACT

Disclosed aspects relate to window management in a stream computing environment to process a stream of tuples using a window of the stream computing environment. A set of tuples which corresponds to the window of the stream computing environment may be detected. The set of tuples may have a set of data. A confidence factor related to a set of expected result data for the set of tuples may be determined based on the set of data of the set of tuples. The set of tuples may correspond to the window of the stream computing environment. The window may be configured in the stream computing environment based on the confidence factor. The window may be configured in the stream computing environment to process the stream of tuples.

1 Claim, 9 Drawing Sheets

Related U.S. Application Data continuation of application No. 15/424,523, filed on Feb. 3, 2017.

(51) Int. Cl.
  *H04L 12/801* (2013.01)
  *H04L 12/807* (2013.01)

(56) References Cited

U.S. PATENT DOCUMENTS

| | | |
|---|---|---|
| 8,674,634 B2 | 10/2014 | Ramamurthy et al. |
| 8,874,634 B2 | 10/2014 | Ramamurthy et al. |
| 2003/0103452 A1 | 6/2003 | Le et al. |
| 2005/0063302 A1 | 3/2005 | Samuels et al. |
| 2005/0096866 A1 | 5/2005 | Shan et al. |
| 2016/0019155 A1 | 1/2016 | Radhakrishnan et al. |
| 2016/0125033 A1 | 5/2016 | Kashiyama |
| 2016/0328464 A1 | 11/2016 | Branson et al. |

OTHER PUBLICATIONS

Pending U.S. Appl. No. 15/424,523, filed Feb. 3, 2017, entitled: "Window Management in a Stream Computing Environment", 62 pages.
Pending U.S. Appl. No. 15/699,309, filed Sep. 8, 2017, entitled: "Window Management in a Stream Computing Environment", 60 pages.
Pending U.S. Appl. No. 15/952,403, filed Apr. 13, 2018, entitled: "Window Management in a Stream Computing Environment", 61 pages.

WINDOW MANAGEMENT IN A STREAM COMPUTING ENVIRONMENT

BACKGROUND

This disclosure relates generally to computer systems and, more particularly, relates to window management in a stream computing environment to process a stream of tuples using a window of the stream computing environment. The amount of data that needs to be managed is increasing. Management of data may be desired to be performed as efficiently as possible. As data needing to be managed increases, the need for window management in a stream computing environment may increase.

SUMMARY

Aspects of the disclosure relate to window management in a stream computing environment to process a stream of tuples using a window of the stream computing environment. A stream operator may generate a confidence factor for an expected result based on a set of data corresponding to a window. The window may be controlled based on the confidence factor. For instance, if the confidence factor is below a threshold value, the window may be maintained until the confidence value reaches or exceeds the threshold value. If the confidence factor has a rate of change that is below a threshold rate of change, then the window may be closed. If the confidence factor has a rate of change that is below a threshold rate of change, then the window may be maintained open, while if the confidence factor has a rate of change that is below a threshold rate of change the window may be closed. Operators may share information about how their windows are being managed to facilitate window management with respect to other operators of the stream computing environment.

Disclosed aspects relate to window management in a stream computing environment to process a stream of tuples using a window of the stream computing environment. A set of tuples which corresponds to the window of the stream computing environment may be detected. The set of tuples may have a set of data. A confidence factor related to a set of expected result data for the set of tuples may be determined based on the set of data of the set of tuples. The set of tuples may correspond to the window of the stream computing environment. The window may be configured in the stream computing environment based on the confidence factor. The window may be configured in the stream computing environment to process the stream of tuples.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
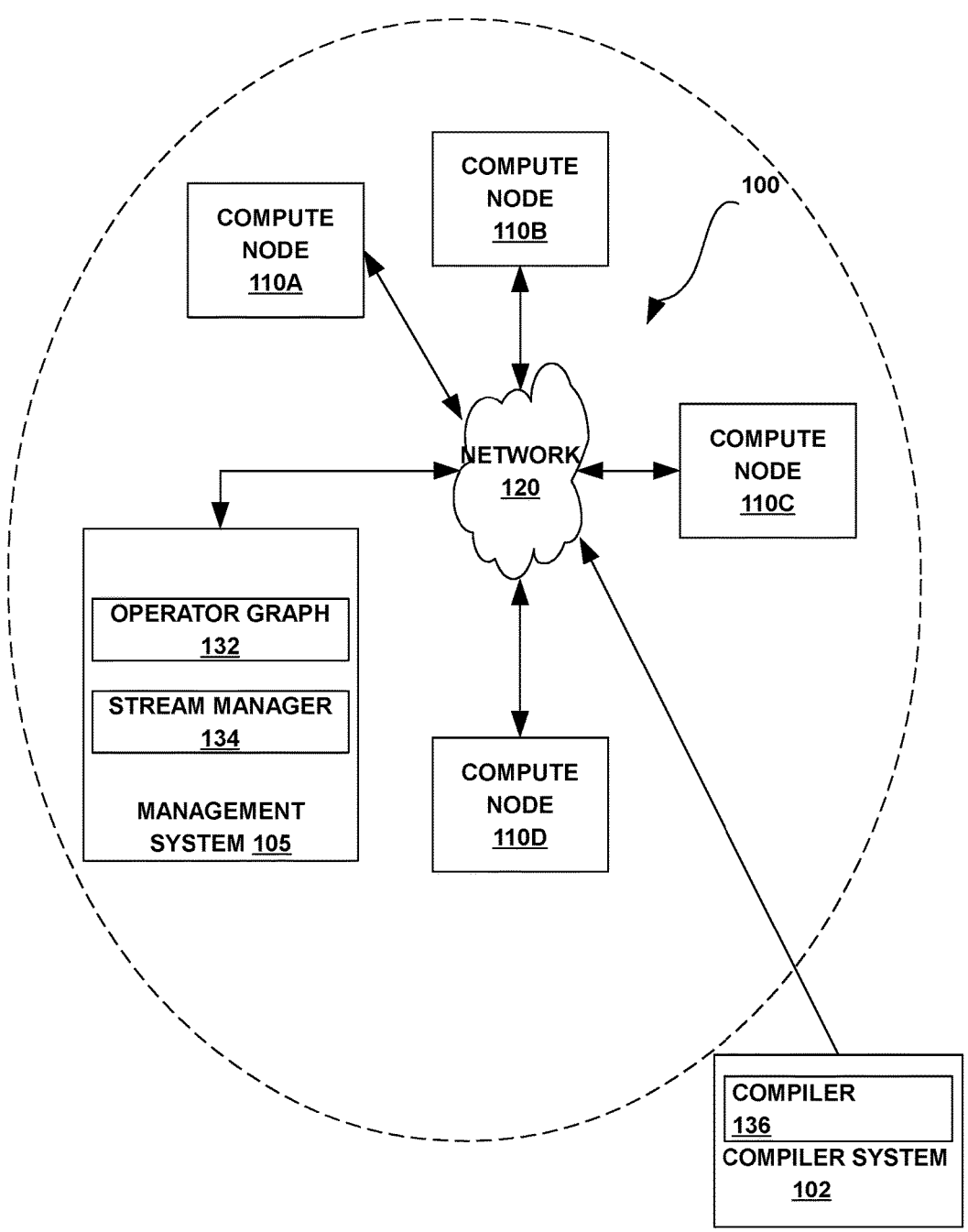
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to window management in a stream computing environment to process a stream of tuples using a window of the stream computing environment. A stream operator may generate a confidence factor for an expected result based on a set of data corresponding to a window (e.g., tuples in the window, tuples that will enter the window, tuples that have exited the window). The window may be controlled based on the confidence factor. For instance, if the confidence factor is below a threshold value, the window may be maintained until the confidence value reaches or exceeds the threshold value. If the confidence factor has a rate of change that is below a threshold rate of change, then the window may be closed. If the confidence factor has a rate of change that is below a threshold rate of change, then the window may be maintained open, while if the confidence factor has a rate of change that is below a threshold rate of change the window may be closed. Operators may share information about how their windows are being managed to facilitate window management with respect to other operators of the stream computing environment. Leveraging confidence factors with respect to windows in a stream computing environment may be associated with benefits related to data throughput rates, resource usage, and stream application performance.

In stream computing environments, stream operators and processing elements may make use of windows to hold or buffer data (e.g., tuples) until it can be processed. Aspects of the disclosure relate to the recognition that, in some situations, windows of stream operators may be associated with challenges related to determining the amount of data to collect in a window before processing it to produce a result (e.g., more data in the window may lead to a more accurate result at the cost of additional processing time, while less data in the window may allow for more expedient results with the tradeoff of potentially lower result reliability/confidence). Accordingly, aspects of the disclosure relate to generating a confidence value for an expected result of a stream operator based on an evaluation of a set of data associated with a window of the stream operator. The window of the stream operator may be controlled based on the generated confidence value (e.g., maintained open longer to collect more data, or closed to facilitate expedient result production). In this way, the size and operational states (e.g., open/closed) of windows may be dynamically managed based on the needs and resource usage of the stream computing environment.

Aspects of the disclosure relate to a system, method, and computer program product for window management in a stream computing environment to process a stream of tuples using a window of the stream computing environment. A set of tuples which corresponds to the window of the stream computing environment may be detected. The set of tuples may have a set of data. A confidence factor related to a set of expected result data for the set of tuples may be determined based on the set of data of the set of tuples. The set of tuples may correspond to the window of the stream computing environment. The window may be configured in the stream computing environment based on the confidence factor. The window may be configured in the stream computing environment to process the stream of tuples.

Aspects of the disclosure relate to modifying a size of the window in the stream computing environment to process the stream of tuples based on the confidence factor. In embodiments, the confidence factor may be compared with a threshold confidence, it may be resolved that the threshold confidence exceeds the confidence factor, and an open state of the window may be maintained in response to resolving that the threshold confidence exceeds the confidence factor. In embodiments, the confidence factor may be compared with a threshold confidence, it may be resolved that the confidence factor exceeds the threshold confidence, and the window may be closed in response to resolving that the confidence factor exceeds the threshold confidence. In embodiments, a change in the confidence factor with respect to a temporal period may be identified, the change in the confidence factor may be compared with a threshold rate, it may be resolved that the change in the confidence factor exceeds the threshold rate, and the window may be maintained in response to resolving that the change in the confidence factor exceeds the threshold rate. In embodiments, a change in the confidence factor with respect to a temporal period may be identified, the change in the confidence factor may be compared with a threshold rate, it may be resolved that the threshold rate exceeds the change in the confidence factor, and the window may be closed in response to resolving that the threshold rate exceeds the change in the confidence factor. In embodiments, the window in the stream computing environment may be configured to process the stream of tuples based on a set of operator data of a set of stream operators. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
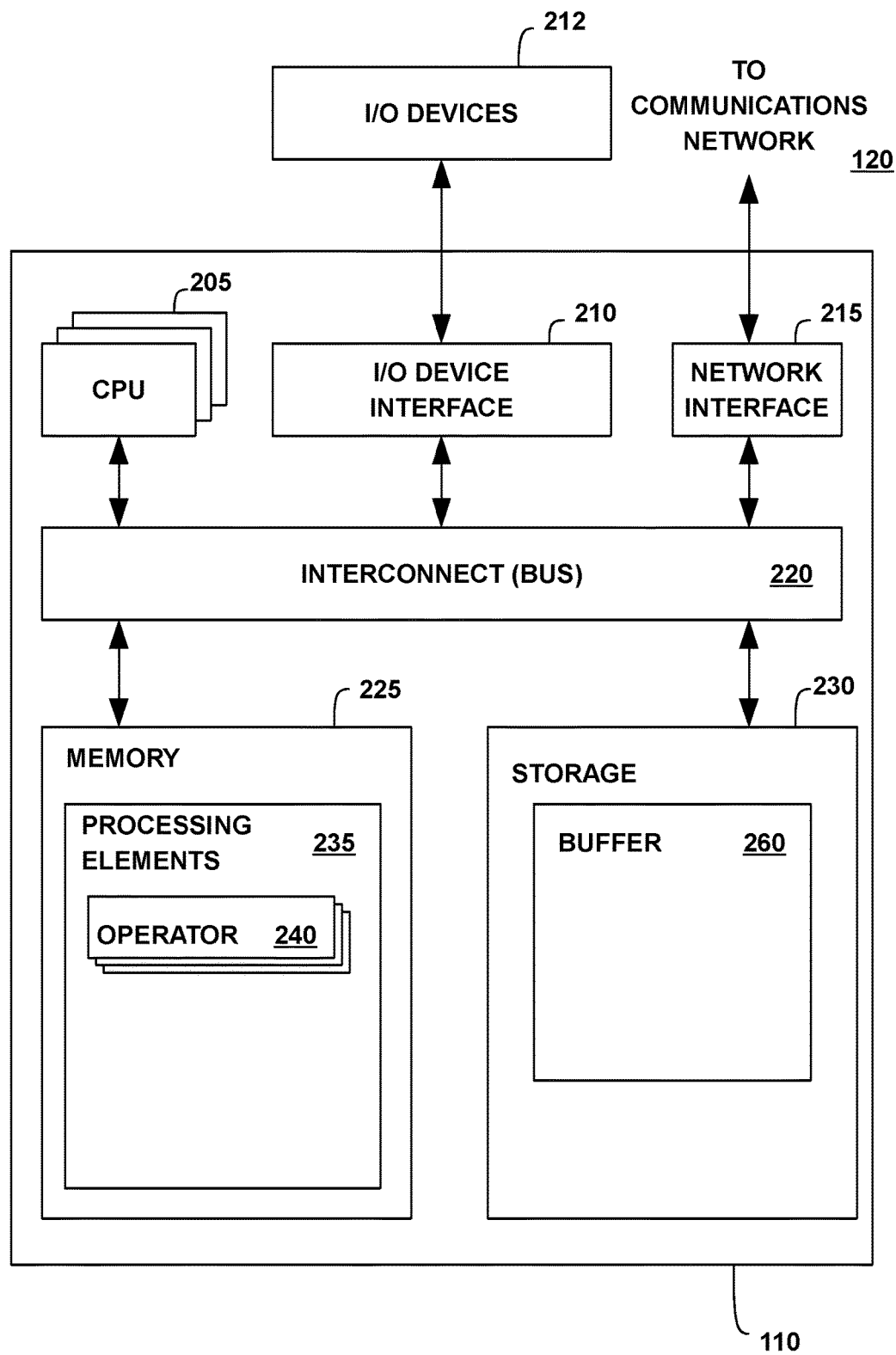
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
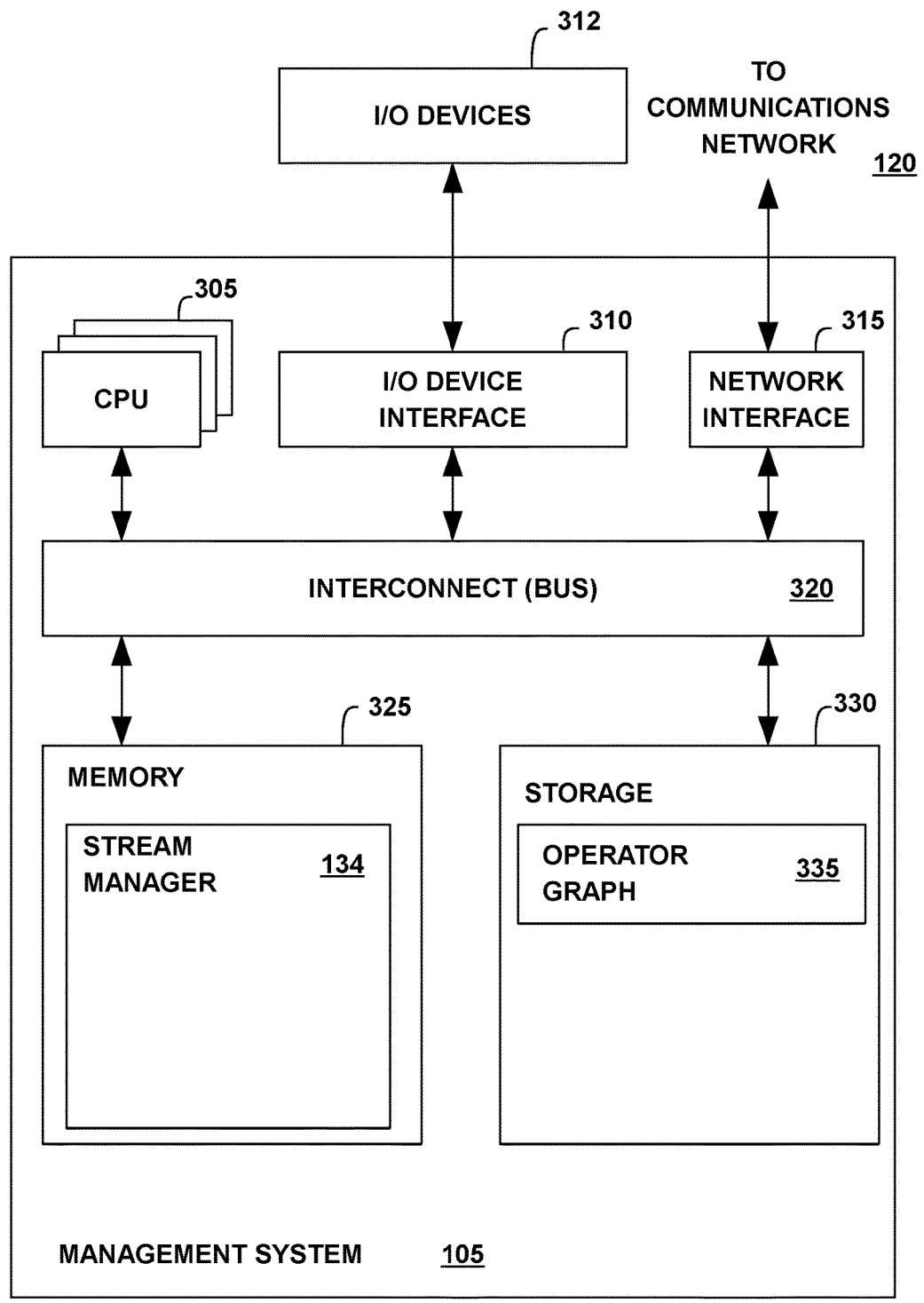
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
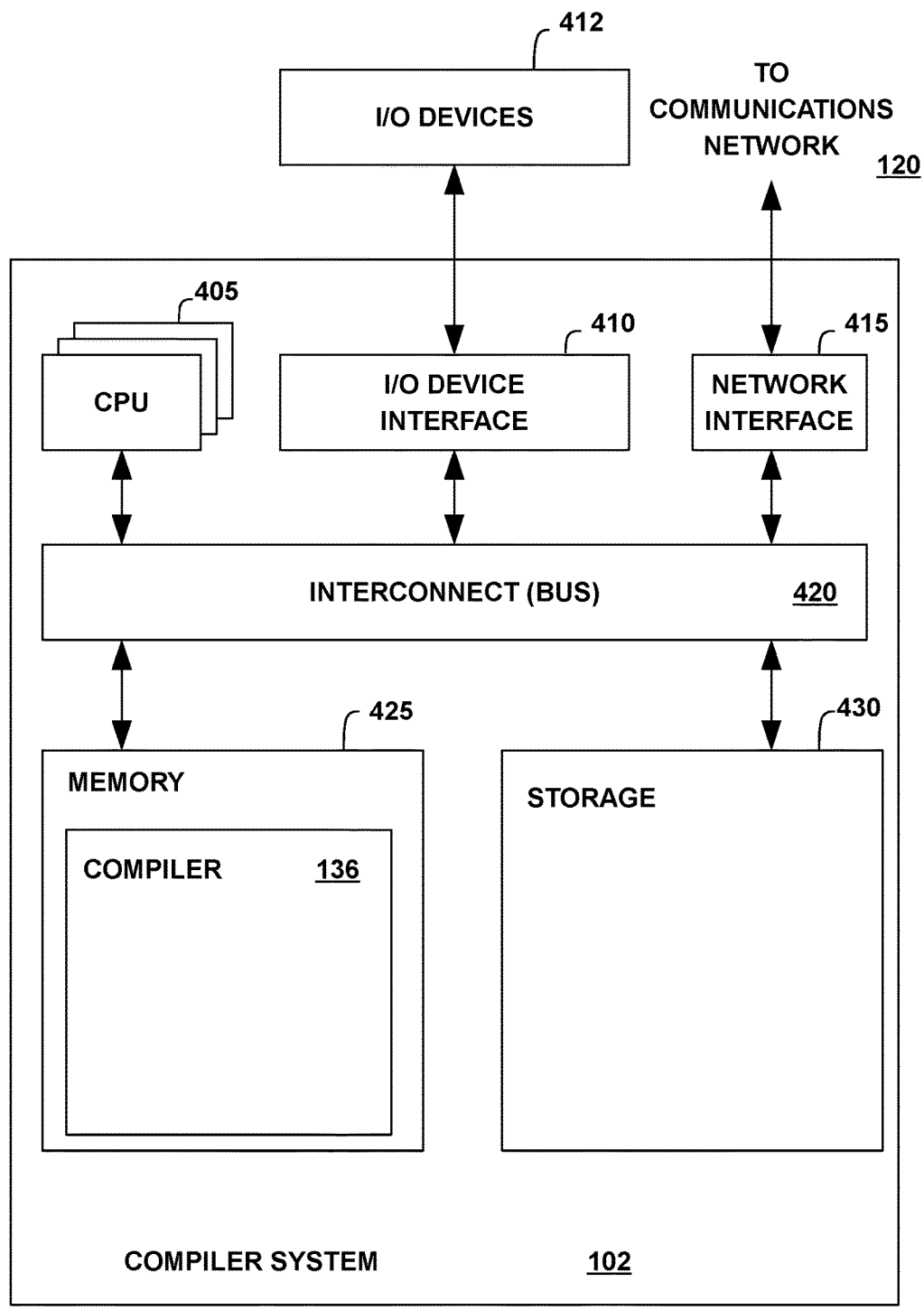
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
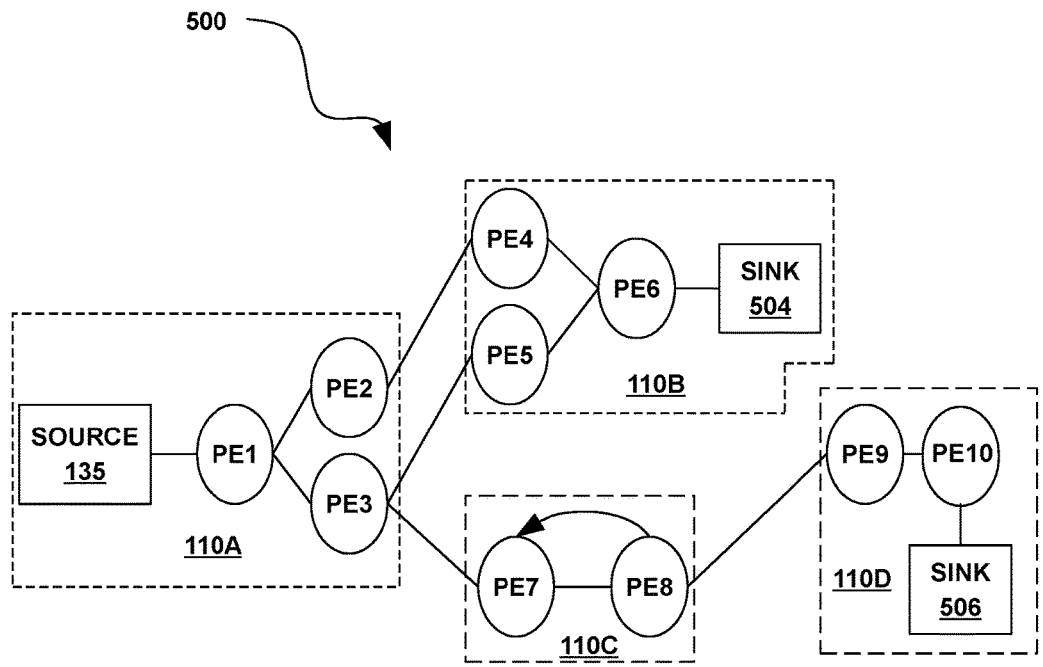
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
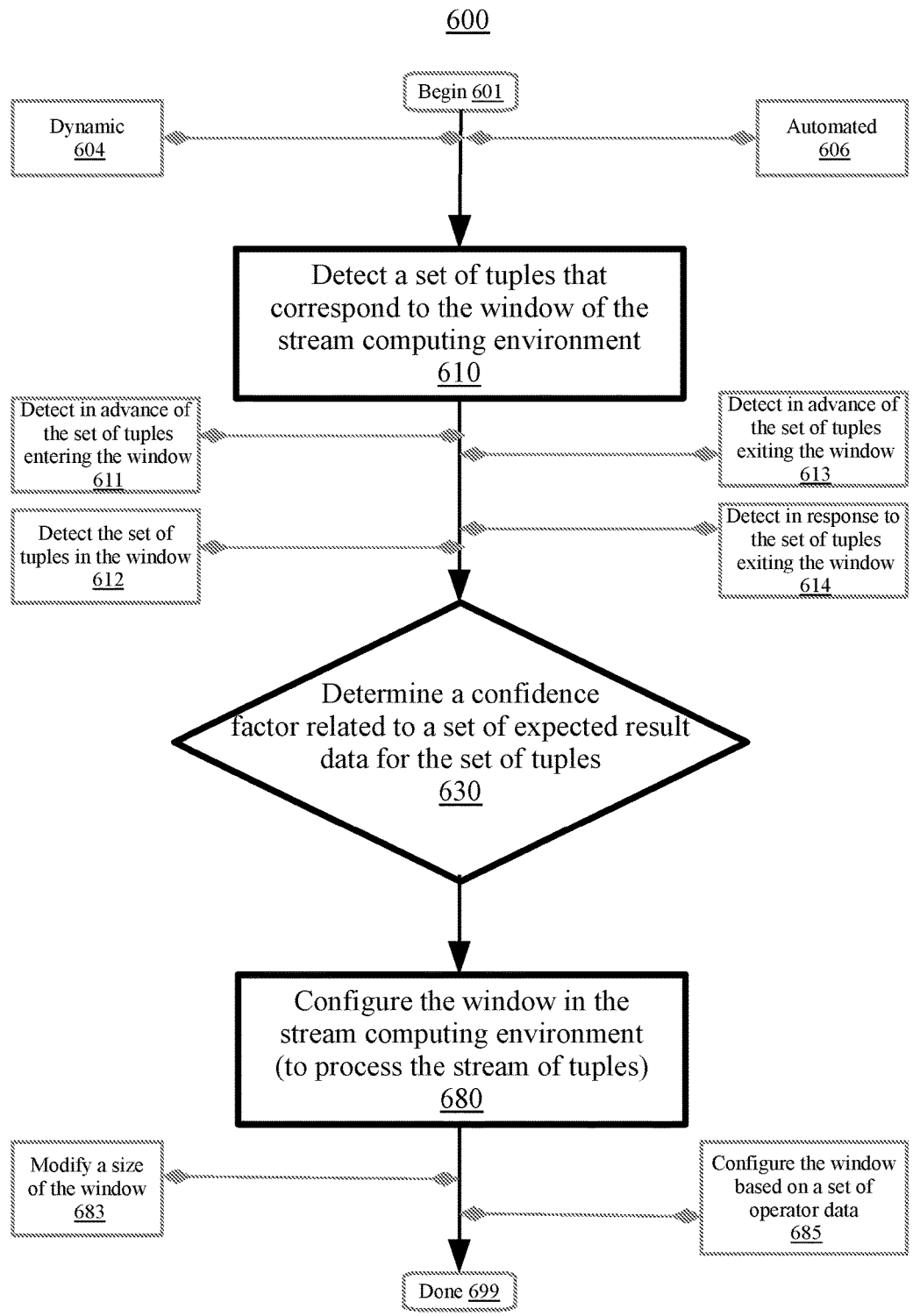
FIG. 6 is a flowchart illustrating a method for window management in a stream computing environment, according to embodiments.

FIG. 6 is a flowchart illustrating a method 600 for window management in a stream computing environment. Aspects of the method 600 relate to configuring a window in a stream computing environment based on a confidence factor related to a set of expected result data for a stream operator. Aspects of the disclosure relate to the recognition that, in some situations, windows of stream operators may be associated with challenges related to determining the amount of data to collect in a window before processing it to produce a result (e.g., more data in the window may lead to a more accurate result at the cost of additional processing time, while less data in the window may allow for more expedient results with the tradeoff of potentially lower result reliability/confidence). Accordingly, aspects of the disclosure relate to generating a confidence value for an expected result of a stream operator based on an evaluation of a set of data associated with a window of the stream operator. The window of the stream operator may be controlled based on the generated confidence value (e.g., maintained open longer to collect more data, or closed to facilitate expedient result production). Altogether, leveraging confidence factors with respect to windows in a stream computing environment may be associated with benefits associated with data throughput rates, resource usage, and stream application performance. The method 600 may begin at block 601.

In embodiments, aspects of the disclosure relate to utilizing the techniques and method steps described herein with respect to an event analyzer. For instance, the detecting, the determining, the configuring, and the other steps described herein may each be performed to manage one or more pools (e.g., windows) with respect to the event analyzer based on a set of data of a set of events (e.g., tuples). Other possible environments for implementation of aspects of the disclosure are also possible In embodiments, the detecting, the determining, the configuring, and the other steps described herein may each be executed in a dynamic fashion to streamline window management in the stream computing environment at block 604. For instance, the detecting, the determining, the configuring, and the other steps described herein may occur in real-time, ongoing, or on-the-fly. As an example, one or more steps described herein may be performed in real-time (e.g., confidence factors may be determined for expected result data as tuples flow in and out of stream operators in real-time, and stream operator windows may be dynamically configured based on determined confidence factors) in order to streamline (e.g., facilitate, promote, enhance) window management in the stream computing environment. Other methods of performing the steps described herein are also possible.

In embodiments, the detecting, the determining, the configuring, and the other steps described herein may each be executed in an automated fashion without user intervention at block 606. In embodiments, the detecting, the determining, the configuring, and the other steps described herein may be carried out by an internal window management module maintained in a persistent storage device of a local computing device (e.g., network node). In embodiments, the detecting, the determining, the configuring, and the other steps described herein may be carried out by an external window management module hosted by a remote computing device or server (e.g., server accessible via a subscription, usage-based, or other service model). In this way, aspects of window management may be performed using automated computing machinery without manual action. Other methods of performing the steps described herein are also possible.

At block 610, a set of tuples which corresponds to the window of the stream computing environment may be detected. The set of tuples may have a set of data. Generally, detecting can include sensing, recognizing, discovering, ascertaining, or otherwise identifying the set of tuples which correspond to the window of the stream computing environment. The stream computing environment may include one or more stream operators (e.g. processing elements) configured to perform operations (logic-based analysis, attribute modification) on the set of tuples as part of a stream computing application. The set of tuples may include a collection of quantized data units. The set of tuples may enter the stream computing environment as input tuples, and be processed by one or more stream operators to produce output tuples. In embodiments, the set of tuples may have a set of data. The set of data may include formatted or unformatted information (e.g., payload of the tuple) configured for analysis or processing (e.g., by a stream operator). As examples, the set of tuples may include image data, text data, audio data, video data, or other types of data. In embodiments, one or more stream operators of the stream computing environment may include a window to facilitate data analysis. The window may include a buffer or queue configured to hold (e.g., maintain) the set of tuples in order to perform one or more analysis operations on the set of tuples. The window may be configured to hold tuples over a particular time duration (e.g., maintain tuples from the last 1 minute, 10 minutes, 4 hours; remain open for an additional 30 seconds), a specified number of tuples (e.g., 500 tuples, 1000 tuples), or a designated capacity of data (e.g., 1 gigabyte, 5 gigabytes). In embodiments, detecting the set of tuples may include using a streams management engine of the stream computing environment to ascertain that the set of tuples is associated with a particular window. For instance, the streams management engine may indicate that a set of tuples is incoming with respect to a particular window, is in process by a particular window, or has recently exited a window (e.g., within a predefined time interval). Other methods of detecting the set of tuples that correspond to the window of the stream computing environment are also possible.

In embodiments, the set of tuples may be detected in advance of the set of tuples entering the window at block 611. Aspects of the disclosure relate to the recognition that, in some situations, tuples that have not yet entered the window may be detected and used for determination of the confidence factor related to a set of expected result data. Generally, detecting can include sensing, recognizing, discovering, ascertaining, or otherwise identifying the set of tuples in advance of (e.g., prior to, before) the set of tuples entering the window. In embodiments, detecting the set of tuples in advance of the set of tuples entering the window may include sensing a set of upstream tuples that are predicted to enter the window within a predetermined time frame (e.g., 1 minute, 4 minutes). For instance, a streams management engine may analyze the topology (e.g., arrangement of stream operators, processing elements, data flow paths) of the operator graph, and ascertain a set of tuples that are traveling along a data flow path that will lead them to the window. In embodiments, detecting the set of tuples in advance of the set of tuples entering the window may include determining an expected set of tuples to enter the window based on a set of tuples that are currently in the window (e.g., other tuples that are related to those that have already been received). Other methods of detecting the set of tuples in advance of the set of tuples entering the window are also possible.

In embodiments, the set of tuples may be detected in the window at block 612. Aspects of the disclosure relate to the recognition that, in some situations, tuples that have entered the window may be detected and used for determination of the confidence factor related to a set of expected result data. Generally, detecting can include sensing, recognizing, discovering, ascertaining, or otherwise identifying the set of tuples in the window. In embodiments, detecting the set of tuples in the window may include sensing a set of tuples that are currently maintained within the window of a particular stream operator. For instance, in certain embodiments, detecting the set of tuples may include analyzing a data traffic log of the tuples that have been received by a particular stream operator window, and ascertaining a set of tuples that have been received by the particular stream operator window and have not yet exited the particular stream operator window (e.g., tuples currently maintained in the stream operator window). In embodiments, detecting the set of tuples may include using a streams management engine to analyze the contents of a particular stream operator window, and identifying the set of tuples stored within the window. Other methods of detecting the set of tuples in the window are also possible.

In embodiments, the set of tuples may be detected in advance of the set of tuples exiting the window at block 613. Aspects of the disclosure relate to the recognition that, in some situations, tuples that have not exited the window (e.g., tuples in the window and tuples that have not yet entered the window) may be detected and used for determination of the confidence factor related to the set of expected result data. Generally, detecting can include sensing, recognizing, discovering, ascertaining, or otherwise identifying the set of tuples in advance of the set of tuples exiting the window. In embodiments, detecting the set of tuples in advance of the set of tuples exiting the window may include sensing both those tuples that are currently maintained in a window of a stream operator as well as those tuples that are expected to enter the window within a predefined time period. For instance, detecting the set of tuples may include using a streams management engine to analyze both a data traffic log of a particular window to identify tuples currently maintained in the window as well as a set of incoming traffic to identify tuples that are expected to be received by the window. Other methods of detecting the set of tuples in advance of the set of tuples exiting the window are also possible.

In embodiments, the set of tuples may be detected in response to the set of tuples exiting the window at block 614. Aspects of the disclosure relate to the recognition that, in some situations, tuples that have exited the window may be detected and used for determination of the confidence factor related to the set of expected result data. Generally, detecting can include sensing, recognizing, discovering, ascertaining, or otherwise identifying the set of tuples in response to the set of tuples exiting the window. In embodiments, detecting the set of tuples may include sensing tuples that have passed out of the window (e.g., tuples that are currently in process by a streaming operator, or tuples that are in transit from the window to another stream operator of the operator graph). For instance, detecting may include using a streams management engine to identify a set of tuples that have exited a particular stream operator window within a predefined time period (e.g., 30 seconds, 2 minutes, 5 minutes). In certain embodiments, detecting may include ascertaining a predefined amount of tuples that have exited a particular stream operator window (e.g., last 50 tuples, last 100 tuples, last 10 megabytes of tuples). In embodiments, detecting may include recording each tuple in a data traffic log as it exits the window, and subsequently identifying the exited tuples as the set of tuples. Other methods of detecting the set of tuples in response to the set of tuples exiting the window are also possible.

At block 630, a confidence factor related to a set of expected result data for the set of tuples may be determined. The determination may be based on the set of data of the set of tuples. The set of tuples may correspond to the window of the stream computing environment. Generally, determining can include calculating, formulating, identifying, resolving, deriving, computing, or otherwise ascertaining the confidence factor related to the set of expected result data based on the set of data of the set of tuples. The set of expected result data may include information pertaining to a predicted outcome that may be generated based on the data currently available to a stream operator (e.g., using tuples in the window, tuples that are expected to enter/exit the window within a predefined time interval). The confidence factor may include a representation, expression, or other indication of the degree/extent of expected accuracy, validity, or usefulness of the set of expected result data. The confidence factor may be expressed as a quantitative value (e.g., integer between 0 and 100, such that lower integers indicate lower confidence and greater integers indicate greater confidence) or a qualitative assessment (e.g., high confidence, low confidence). In embodiments, the confidence factor may be determined based on the set of data of the set of tuples. For instance, the set of data of the set of tuples may be evaluated to assess the forecasted accuracy or validity of a result generated using the set of tuples corresponding to the window. In embodiments, determining the confidence factor may include using the set of data of the set of tuples to calculate a probability (e.g., expressed as a percentage) that the set of expected result data achieves a validity threshold (e.g., useful, accurate, reliable outcome).

Consider the following example. A particular stream operator may be configured to calculate an average fuel economy value for a vehicle using a set of tuples that indicate measured fuel economy values for the vehicle. A streams management engine may analyze a set of tuples in a window of the stream operator, and identify that there are currently 2 tuples in the window of the stream operator. A first tuple may indicate a fuel economy value of "21.6 miles per gallon" and a second tuple may indicate a fuel economy value of "34.1 miles per gallon." Accordingly, the streams management engine may ascertain that 2 tuples does not achieve a designated sample size threshold (e.g., 500 tuples), and that a statistical agreement between the fuel economy values of the two tuples does not achieve a designated statistical agreement threshold (e.g., due to the disparity between the fuel economy values). As such, the streams management engine may determine a confidence value of "16" with respect to the set of expected result data for the set of tuples (e.g., indicating low confidence that the set of expected result data for the set of tuples indicates an accurate/reliable average value for the fuel economy of the vehicle). Other methods of determining the confidence factor related to the set of expected result data for the set of tuples are also possible.

At block 680, the window may be configured in the stream computing environment. The configuring may be based on the confidence factor. The configuring may occur to process the stream of tuples. Aspects of the disclosure relate to the recognition that, in some situations, configuration of a stream operator window based on a confidence factor related to an expected result set may be associated with benefits related to stream application efficiency and performance. Generally, configuring can include structuring, controlling, modifying, regulating, adjusting, setting-up, or otherwise managing the window based on the confidence factor. In embodiments, configuring may include controlling an operational state of a window based on the confidence factor related to the set of expected result data. For instance, in certain embodiments, configuring may include setting the window to a closed operational state such that no further tuples are accepted for storage/buffering by the window (e.g., the confidence factor achieves a threshold confidence, and no further data is necessary). In embodiments, configuring may include setting the window to an open operational state such that additional tuples are accepted for storage/buffering by the window (e.g., the confidence factor does not achieve a threshold confidence, and so further data is collected to positively impact the result). In embodiments, configuring may include establishing a time-to-live value for the window. The time-to-live value may include a predefined time period after which the operational state of the window automatically changes to a different state. As an example, a time-to-live value of "120 seconds" may be defined for a window in an open operational state that achieves a threshold confidence, such that once the time-to-live value expires the window is automatically configured to a closed operational state. Other methods of configuring the window in the stream computing environment based on the confidence factor are also possible.

In embodiments, a size of the window in the stream computing environment may be modified at block 683. The modifying may be based on the confidence factor. The modifying may occur to process the stream of tuples. Generally, modifying can include increasing, decreasing, altering, adjusting, revising, or otherwise changing the window size of a window in the stream computing environment. The window size may include one or more parameters that designate the amount of data (e.g., number of tuples) that may be maintained by a particular window of a streaming operator. As described herein, in embodiments the window size may specify a time-frame for which tuples may be held in the window (e.g., hold the last/most recent 10 minutes of tuples, last 30 minutes of tuples, last 2 hours of tuples). For instance, the window size may specify a number of tuples to be held by a window (e.g., most recent 100 tuples, most recent 500 tuples, most recent 1500 tuples). As another example, the window size may designate an amount of data to be maintained by a window (e.g., 4 gigabytes of tuples, 7 gigabytes of tuples). In embodiments, the window size may be modified based on the confidence factor determined for the set of expected result data. For instance, in embodiments, modifying the window size may include increasing the window size in response to determining that the confidence factor does not achieve a threshold confidence (e.g., and thus more data/tuples are desired to generate a more accurate/reliable result). In embodiments, modifying the window size may include decreasing the window size in response to determining that the confidence factor achieves a threshold confidence (e.g., a valid result set can be produced using the available data, and additional tuples are not necessary). Other methods of modifying the size of the window in the stream computing environment are also possible.

In embodiments, the window may be configured in the stream computing environment based on a set of operator data of a set of stream operators at block 685. The configuring may occur to process the stream of tuples. Aspects of the disclosure, in embodiments, relate to configuring a window of one or more stream operators of the set of stream operators based on operator data communicated between stream operators. Generally, configuring can include structuring, controlling, modifying, regulating, adjusting, setting-up, or otherwise managing the window based on the set of operator data of the set of stream operators. The set of operator data may include information regarding operator attributes (e.g., operator type/function, throughput rate), system resource usage (e.g., 2 megabytes of memory), current goals/objectives (e.g., expedient result generation is prioritized, accurate results are prioritized), window configurations (e.g., current window size, past window sizes, expected future window sizes based on objectives) or the like. The set of operator data may be configured to be communicated (e.g., transmitted, exchanged, sent) between one or more operators of the stream computing environment. In embodiments, a window in the stream computing environment may be configured based on the set of operator data. For instance, in response to a first stream operator receiving a set of operator data indicating that one or more downstream stream operators is in need of a particular set of result data (e.g., within a designated time frame such as 10 seconds, 30 seconds, 1 minute), a window of the first stream operator may be closed or decreased in size to facilitate expedient result generation. As another example, in response to a first stream operator receiving a set of operator data indicating that one or more downstream operators is configured to prioritize result accuracy (e.g., result data achieves an accuracy/reliability threshold), a window of the first stream operator may be opened or increased in size to facilitate generation of accurate/reliable results. Other methods of configuring the window in the stream computing environment based on a set of operator data of a set of stream operators is also possible.

Consider the following example. A streams management engine may detect a set of tuples having a set of image data. The set of tuples may include tuples that are both currently maintained in a window of a stream operator as well as tuples that are expected to be routed to the window. In embodiments, the streams management engine may analyze the set of image data of the set of tuples to determine a confidence factor that a set of expected result data will achieve a threshold image resolution level of 1080p (e.g., 1920 pixels by 1080 pixels). For instance, the streams management engine may examine the total number of tuples corresponding to the window and the content of the set of image data included by the set of tuples to compute a probability that an image achieving the threshold image resolution level can be generated using the set of tuples. As an example, in embodiments, a confidence factor of 64% may be determined with respect to the set of tuples. Based on the confidence factor, the window in the stream computing environment may be configured. In embodiments, the confidence factor may be compared to one or more threshold confidence levels to ascertain whether additional tuples should be collected by the window (e.g., to achieve a higher resolution level for the resulting image), or whether the current set of tuples is sufficient to produce a result (e.g., based on the data demands of downstream operators). As an example, in certain embodiments the confidence factor may be compared to a threshold confidence level, and it may be determined that the confidence level of 64% fails to achieve a threshold confidence level of 75%. Accordingly, in certain embodiments, the window of the stream operator may be maintained in an open state for a predefined time period (e.g., 80 seconds), at which point the confidence factor may be reevaluated with respect to the threshold confidence level. Other methods of window management based on a confidence factor are also possible.

Method 600 concludes at block 699. Aspects of method 600 may provide performance or efficiency benefits for window management in a stream computing environment. Aspects may save resources such as network bandwidth, storage, processing, or memory. For example, opening/increasing a window size (e.g., in response to determining that a confidence factor for an expected result does not achieve a confidence threshold) may be associated with accurate/valid result sets, and closing/decreasing a window size (e.g., in response to determining that a confidence factor for an expected result achieves a confidence threshold) may be associated with expedient result generation. Altogether, leveraging confidence factors with respect to windows in a stream computing environment may be associated with benefits associated with data throughput rates, resource usage, and stream application performance.

Figure 7:
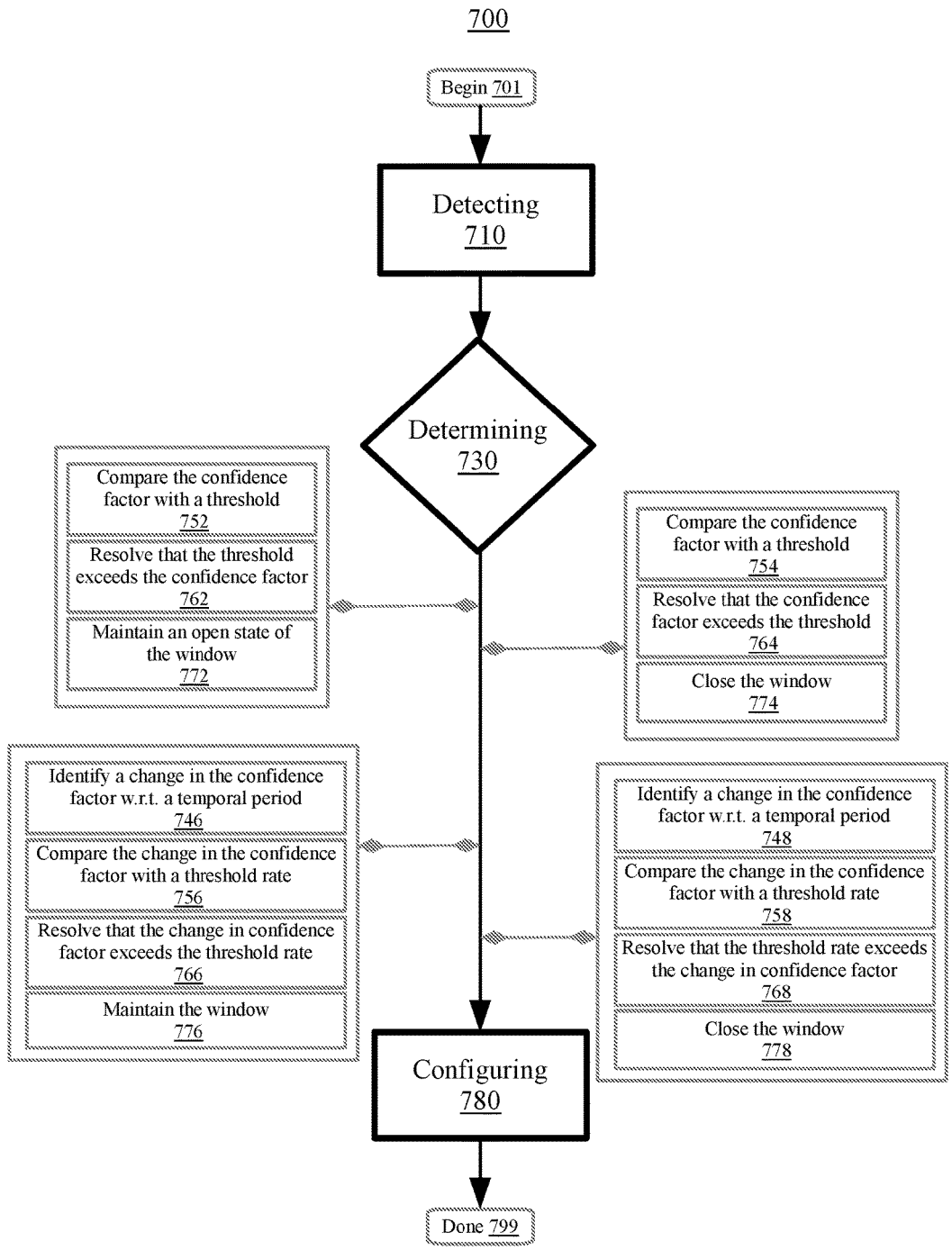
FIG. 7 is a flowchart illustrating a method for window management in a stream computing environment, according to embodiments.

FIG. 7 is a flowchart illustrating a method 700 for window management in a stream computing environment. Aspects of method 700 relate to comparing a confidence factor related to a set of expected result data to a threshold confidence, and managing a window based on the relationship between the confidence factor and the threshold confidence. Aspects of method 700 may be similar to or the same as aspects of method 600, and aspects may be utilized interchangeably with one or more methodologies described herein. Altogether, leveraging confidence factors with respect to windows in a stream computing environment may be associated with benefits associated with data throughput rates, resource usage, and stream application performance. The method 700 may begin at block 701.

At block 710, a set of tuples which correspond to the window of the stream computing environment may be detected. The set of tuples may have a set of data. At block 730, a confidence factor related to a set of expected result data for the set of tuples may be determined. The determining may be based on the set of data of the set of tuples. The set of tuples may correspond to the window of the stream computing environment.

In embodiments, the confidence factor may be compared with a threshold confidence at block 752. Generally, comparing can include contrasting, investigating, correlating, juxtaposing, or analyzing the confidence factor in parallel with the threshold confidence. The threshold confidence may include a benchmark confidence level that defines a boundary between substantially sufficient (e.g., satisfactory, suitable, reliable) and substantially insufficient confidence factors. In embodiments, the threshold confidence may be expressed as an integer value (e.g., 0-100), a probability (e.g., percent), a grade/rating (e.g., letter grade), or the like. For instance, the threshold confidence may include a predetermined confidence factor of "80." In embodiments, comparing may include examining the confidence factor with respect to the threshold confidence to identify a relationship between the magnitude of the confidence factor relative to the threshold confidence (e.g., to ascertain which is greater/lesser). For example, comparing may include examining a confidence factor of "66" with respect to the threshold confidence of "80." Other methods of comparing the confidence factor with the threshold confidence are also possible.

In embodiments, the threshold confidence may be resolved to exceed the confidence factor at block 762. Generally, resolving can include computing, concluding, formulating, ascertaining, or otherwise determining that the threshold confidence exceeds the confidence factor. Resolving that the threshold confidence exceeds the confidence factor may include ascertaining that the threshold confidence is greater than, surpasses, or is otherwise not achieved/equaled by the confidence factor. For instance, with reference to the previous example, in response to comparing the confidence factor with the threshold confidence, it may be determined that the threshold confidence of 80 has a magnitude that is greater than the confidence factor of 66. In embodiments, in response to resolving that the threshold confidence exceeds the confidence factor, an open state of the window may be maintained at block 772. Generally, maintaining can include preserving, continuing, persisting, or otherwise sustaining the open state of the window. Maintaining may include continuing to operate the window in an open state in which tuples may continue to enter the window to be buffered and processed. In embodiments, maintaining may include assigning a time-to-live value to the window, such that the window may be automatically configured to a closed state after expiry of the time-to-live value. As an example, in response to determining that the confidence factor of 66 does not achieve the threshold confidence of 80, a time-to-live value of 180 seconds may be assigned to the window such that the window remains in the open state to collect tuples for another 180 seconds (e.g., at which point the relationship between the confidence factor and the threshold confidence may be reexamined). Other methods of resolving that the threshold confidence exceeds the confidence factor and maintaining an open state of the operator are also possible.

In embodiments, the confidence factor may be compared with a threshold confidence at block 754. Generally, comparing can include contrasting, investigating, correlating, juxtaposing, or analyzing the confidence factor in parallel with the threshold confidence. For instance, the threshold confidence may include a predetermined confidence factor of "75." In embodiments, comparing may include examining the confidence factor with respect to the threshold confidence to identify a relationship between the magnitude of the confidence factor relative to the threshold confidence (e.g., to ascertain which is greater/lesser). For example, comparing may include examining a confidence factor of "94" with respect to the threshold confidence of "75." Other methods of comparing the confidence factor with the threshold confidence are also possible.

In embodiments, the confidence factor may be resolved to exceed the threshold confidence at block 764. Generally, resolving can include computing, concluding, formulating, ascertaining, or otherwise determining that the confidence factor exceeds the threshold confidence. Resolving that the threshold confidence exceeds the confidence factor may include ascertaining that the confidence factor is greater than, surpasses, or otherwise achieves the threshold confidence. For instance, with reference to the previous example, in response to comparing the confidence factor with the threshold confidence, it may be determined that the confidence factor of 94 has a magnitude that is greater than the threshold confidence of 75. In embodiments, in response to resolving that the confidence factor exceeds the threshold confidence, the window may be closed at block 774. Generally, closing can include shutting, halting, blocking, or otherwise ceasing operation of the window. Closing may include configuring the window to a closed state in which tuples are not allowed to enter the window. In embodiments, closing may include processing one or more tuples of the set of tuples that remain in the window to generate a set of result data (e.g., output tuples), ejecting (e.g., dequeuing, transmitting, sending) the set of tuples from the window, and preventing additional tuples from entering the window. As an example, in embodiments, in response to determining that the confidence factor of 94 achieves the threshold confidence of 75, a set of tuples stored in the window may be processed to produce output tuples that are transmitted to a downstream operator, and the window may be closed to further tuple traffic (e.g., as the confidence factor of the set of tuples achieves the threshold confidence, no further tuples are required to produce a result). Other methods of resolving that the confidence factor exceeds the threshold confidence and closing the window are also possible.

In embodiments, a change in the confidence factor with respect to a temporal period may be identified at block 746. Generally, identifying can include detecting, sensing, recognizing, discovering, distinguishing, or otherwise ascertaining the change in the confidence factor with respect to the temporal period. The temporal period may include a time frame, interval, or other duration over which the change in the confidence factor is tracked or monitored. The change in the confidence factor may include a fluctuation or variation in the confidence factor as a function of time. In embodiments, the change may be indicative of a trend (e.g., movement or tendency) in the progression of the confidence factor (e.g., increasing trend, decreasing trend). In embodiments, identifying the change in the confidence factor may include tracking the confidence factor as a function of the temporal period, and ascertaining that a value for the confidence factor has fluctuated from a first value (e.g., 18) to a second value (e.g., 22) during the temporal period. As an example, it may identified that the confidence factor increases by an average of 7 points every 20 seconds. In embodiments, the change in the confidence factor may be compared with a threshold rate at block 756. Generally, comparing can include contrasting, investigating, correlating, juxtaposing, or analyzing the change in the confidence factor in parallel with the threshold rate. The threshold rate may include a benchmark rate of change that defines a boundary between substantially significant (e.g., meaningful, indicative of a trend/pattern) and substantially insufficient rates of change in the confidence factor. For example, the threshold rate may include a value of "1 point per 5 seconds." In embodiments, comparing may include examining the change in the confidence factor with respect to the threshold rate to identify a relationship between the magnitude of the change in the confidence factor relative to the threshold rate (e.g., to ascertain which is greater/lesser). For example, comparing may include examining a change in the confidence factor of "7 points per 20 seconds" with respect to the threshold rate of "1 point per 5 seconds." Other methods of comparing the change in the confidence factor with the threshold rate are also possible.

In embodiments, the change in the confidence factor may be resolved to exceed the threshold rate at block 766. Generally, resolving can include computing, concluding, formulating, ascertaining, or otherwise determining that the change in the confidence factor exceeds the threshold rate. Resolving may include ascertaining that the change in the confidence factor achieves, meets, surpasses, or is greater than or equal to the threshold rate. For instance, with reference to the previous example, in response to comparing the change in the confidence factor with the threshold rate, it may be determined that the change in the confidence factor of "7 points per 20 seconds" surpasses the threshold rate of "1 point per 5 seconds." In embodiments, in response to resolving that the change in the confidence factor exceeds the threshold rate, the window may be maintained at block 776. Generally, maintaining can include preserving, continuing, persisting, or otherwise sustaining the open state of the window. Maintaining may include continuing to operate the window in an open state in which tuples may continue to enter the window to be buffered and processed. In embodiments, maintaining may include assigning a time-to-live value to the window, such that the window may be automatically configured to a closed state after expiry of the time-to-live value. As an example, in embodiments, in response to determining that the change in the confidence factor of 7 points per 20 seconds achieves the threshold rate of 1 point per 5 seconds, a time-to-live value of 240 seconds may be assigned to the window such that the window remains in the open state (e.g., to collect tuples) for another 240 seconds (e.g., at which point the relationship between the change in the confidence factor and the threshold rate may be reexamined). Other methods of resolving that the change in the confidence factor exceeds the threshold rate and maintaining an open state of the operator are also possible.

In embodiments, a change in the confidence factor with respect to a temporal period may be identified at block 748. Generally, identifying can include detecting, sensing, recognizing, discovering, distinguishing, or otherwise ascertaining the change in the confidence factor with respect to the temporal period. As described herein, the temporal period may include a time frame, interval, or other duration over which the change in the confidence factor is tracked or monitored. The change in the confidence factor may include a fluctuation or variation in the confidence factor as a function of time. In embodiments, the change may be indicative of a trend (e.g., movement or tendency) in the progression of the confidence factor (e.g., increasing trend, decreasing trend). In embodiments, identifying the change in the confidence factor may include tracking the confidence factor as a function of the temporal period, and ascertaining that a value for the confidence factor has fluctuated from a first value (e.g., 56) to a second value (e.g., 41) during the temporal period. As an example, it may identified that the confidence factor increases by an average of 2 points every 55 seconds. In embodiments, the change in the confidence factor may be compared with a threshold rate at block 758. Generally, comparing can include contrasting, investigating, correlating, juxtaposing, or analyzing the change in the confidence factor in parallel with the threshold rate. The threshold rate may include a benchmark rate of change that defines a boundary between substantially significant (e.g., meaningful, indicative of a trend/pattern) and substantially insufficient rates of change in the confidence factor. For example, the threshold rate may include a value of "1 point every 10 seconds." In embodiments, comparing may include examining the change in the confidence factor with respect to the threshold rate to identify a relationship between the magnitude of the change in the confidence factor relative to the threshold rate (e.g., to ascertain which is greater/lesser). For example, comparing may include examining a change in the confidence factor of "2 points per 55 seconds" with respect to the threshold rate of "1 point per 10 seconds." Other methods of comparing the change in the confidence factor with the threshold rate are also possible.

In embodiments, the threshold rate may be resolved to exceed the change in the confidence factor at block 768. Generally, resolving can include computing, concluding, formulating, ascertaining, or otherwise determining that the threshold rate exceeds the change in the confidence factor. Resolving may include ascertaining that the threshold rate is greater than, surpasses, or is not achieved/met by the confidence factor. For instance, with reference to the previous example, in response to comparing the change in the confidence factor with the threshold rate, it may be determined that the change in the confidence factor of "2 points per 55 seconds" does not achieve the threshold rate of "1 point per 10 seconds." In embodiments, in response to resolving that the threshold rate exceeds the change in the confidence factor, the window may be closed at block 778. The closing may occur in response to resolving that the threshold rate exceeds the change in the confidence factor. Generally, closing can include shutting, halting, blocking, or otherwise ceasing operation of the window. Closing may include configuring the window to a closed state in which tuples are not allowed to enter the window. In embodiments, closing may include processing one or more tuples of the set of tuples that remain in the window to generate a set of result data (e.g., output tuples), ejecting (e.g., dequeuing, transmitting, sending) the set of tuples from the window, and preventing additional tuples from entering the window. As an example, in response to determining that the change in the confidence factor of "2 points per 55 seconds" does not achieve the threshold rate of "1 point per 10 seconds," a set of tuples stored in the window may be processed to produce output tuples that are transmitted to a downstream operator, and the window may be closed to further tuple traffic (e.g., as the confidence factor is not substantially changing, it may no longer be necessary to maintain the window in an open state). Other methods of resolving that the threshold rate exceeds the change in the confidence factor and closing the window are also possible.

At block 780, the window may be configured in the stream computing environment. The configuring may be based on the confidence factor. The configuring may occur to process the stream of tuples. Method 700 concludes at block 799. Aspects of method 700 may provide performance or efficiency benefits for window management in a stream computing environment. Aspects may save resources such as network bandwidth, storage, processing, or memory. Altogether, leveraging confidence factors with respect to windows in a stream computing environment may be associated with benefits associated with data throughput rates, resource usage, and stream application performance.

Figure 8:
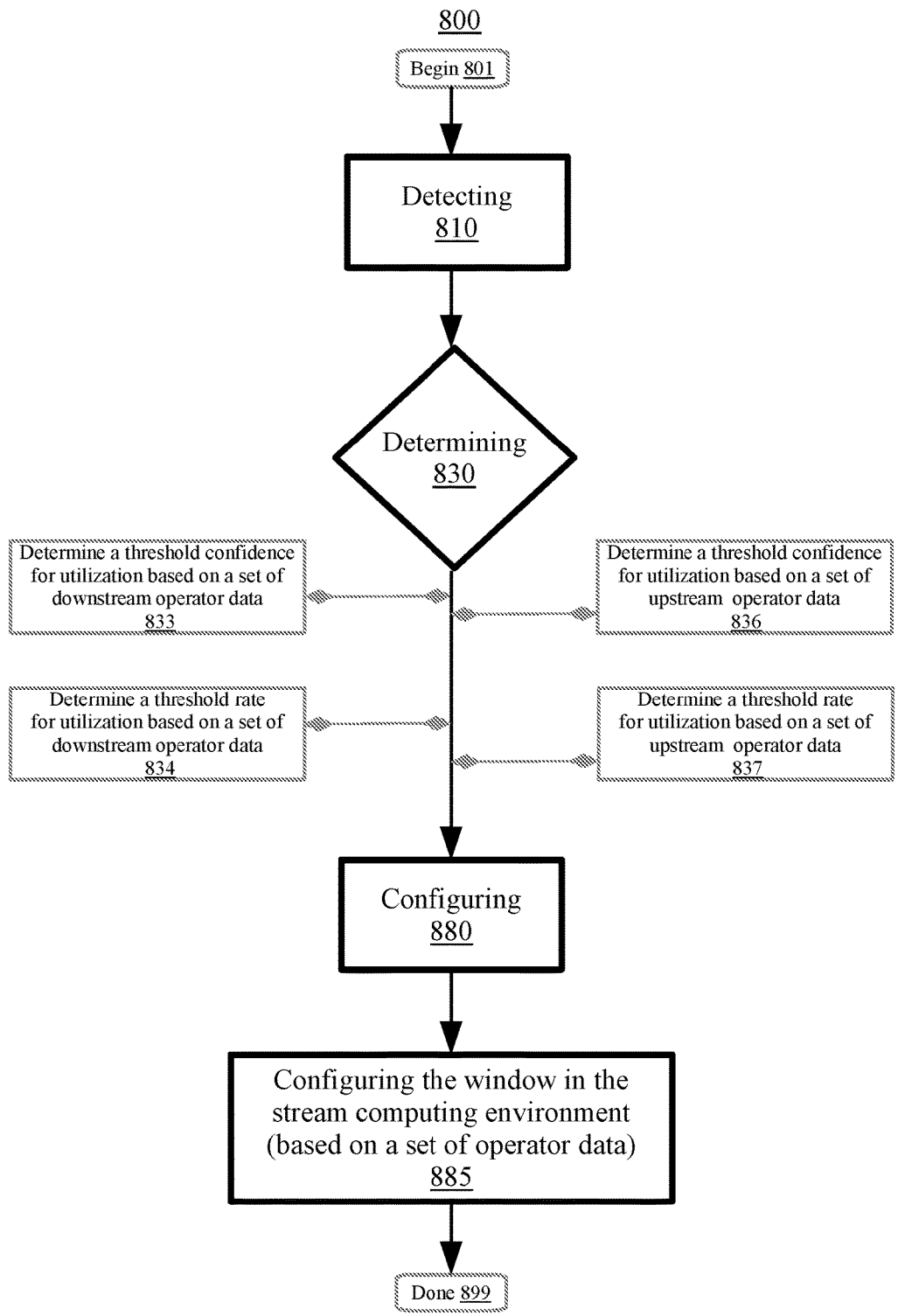
FIG. 8 is a flowchart illustrating a method for window management in a stream computing environment, according to embodiments.

FIG. 8 is a flowchart illustrating a method 800 for window management in a stream computing environment. Aspects of method 800 relate to determining threshold confidences and threshold rates based on operator data for upstream and downstream stream operators. Aspects of method 800 may be similar to or the same as aspects of method 600/700, and aspects may be utilized interchangeably with one or more methodologies described herein. Altogether, leveraging confidence factors with respect to windows in a stream computing environment may be associated with benefits associated with data throughput rates, resource usage, and stream application performance. The method 800 may begin at block 801.

At block 810, a set of tuples which correspond to the window of the stream computing environment may be detected. The set of tuples may have a set of data. At block 830, a confidence factor related to a set of expected result data for the set of tuples may be determined. The determining may be based on the set of data of the set of tuples. The set of tuples may correspond to the window of the stream computing environment.

In embodiments, a threshold confidence for utilization may be determined at block 833. The determining may be based on a set of downstream operator data of a downstream operator of the set of stream operators. The determining may occur to configure the window in the stream computing environment to process the stream of tuples. Generally, determining can include calculating, formulating, identifying, resolving, deriving, computing, or otherwise ascertaining the threshold confidence based on the set of downstream operator data of a downstream operator of the set of operators. A downstream operator may include a stream operator that is located further down (e.g., later, after) a data-flow path of the operator graph with respect to a particular window of the stream operator. The set of downstream operator data may include information regarding the operator attributes (e.g., operator type/function, throughput rate), system resource usage (e.g., 2 megabytes of memory), current goals/objectives (e.g., expedient result generation is prioritized, accurate results are prioritized), window configurations (e.g., current window size, past window sizes, expected future window sizes based on objectives) or other aspects of one or more downstream operators. The set of downstream operator data may be collected by a stream operator associated with a window in the stream computing environment. In embodiments, determining the threshold confidence may include examining the set of downstream operator data to identify a set of expected result criteria that indicates conditions, parameters, and properties requested of the set of expected result data by one or more downstream operators, and subsequently computing the threshold confidence based on the set of expected result criteria. As an example, a set of downstream operator data may be collected that has a set of expected result criteria that indicates that the set of expected result data should be generated using no less than 100 tuples (e.g., lesser numbers of tuples do not constitute a representative sample size for a result). Accordingly, a threshold confidence may be calculated such that sets of expected result data based on 100 or more tuples are associated with substantially high confidence, and sets of expected result data based on less than 100 tuples are associated with substantially low confidence. Other methods of determining the threshold confidence for utilization based on a set of downstream operator data for one or more downstream operators of the set of stream operators are also possible.

In embodiments, a threshold rate for utilization may be determined at block 834. The determining may be based on a set of downstream operator data of a downstream operator of the set of stream operators. The determining may occur to configure the window in the stream computing environment to process the stream of tuples. Generally, determining can include calculating, formulating, identifying, resolving, deriving, computing, or otherwise ascertaining the threshold rate based on the set of downstream operator data of a downstream operator of the set of stream operators. In embodiments, determining the threshold rate may include evaluating the set of downstream operator data to ascertain the data input and output requirements of one or more downstream operators, and subsequently computing a threshold rate such that the data input and output requirements of the downstream operators can be achieved. As an example, a set of downstream operator data may be collected that indicates that one or more downstream operators are decreasing their own window sizes from 1 gigabyte of tuples to 500 megabytes of tuples (e.g., expedient generation of result data is being prioritized over result accuracy). Accordingly, a threshold rate may be calculated for one or more stream operators upstream with respect to the set of downstream operators such that greater changes in the confidence rate are required to maintain an open state of a window (e.g., resulting in windows closing sooner, expediting transmission of expected result data to downstream operators). Other methods of determining the threshold rate based on the set of downstream operator data of a downstream operator of the set of stream operators are also possible.

In embodiments, a threshold confidence for utilization may be determined at block 836. The determining may be based on a set of upstream operator data of an upstream operator of the set of stream operators. The determining may occur to configure the window in the stream computing environment to process the stream of tuples. Generally, determining can include calculating, formulating, identifying, resolving, deriving, computing, or otherwise ascertaining the threshold confidence based on the set of upstream operator data of an upstream operator of the set of stream operators. An upstream operator may include a stream operator that is located earlier (e.g., prior to, before) within a data-flow path of the operator graph with respect to a particular window of the stream operator. The set of upstream operator data may include information regarding the operator attributes (e.g., operator type/function, throughput rate), system resource usage (e.g., 2 megabytes of memory), current goals/objectives (e.g., expedient result generation is prioritized, accurate results are prioritized), window configurations (e.g., current window size, past window sizes, expected future window sizes based on objectives) or other aspects of one or more upstream operators. The set of upstream operator data may be collected by a stream operator associated with a window in the stream computing environment. In embodiments, determining the threshold confidence may include examining the set of upstream operator data to determine a preliminary notification of the type, function, or attributes of the tuples that are expected to be received by a stream operator, and computing the threshold confidence based on the nature of incoming tuples. As an example, a stream operator may collect a set of upstream operator data that indicates that incoming tuples relate to an operation of fitting a mathematical function to a group of 200 data points (e.g., wherein each data point corresponds to a different tuple). Accordingly, a threshold confidence may be computed such that a window having less than 200 tuples is associated with substantially low confidence (e.g., as not all data points are included), and a window having 200 or more tuples is associated with substantially low confidence (e.g., as all the data points are included). Other methods of calculating the threshold confidence based on the set of upstream operator data of an upstream operator of the set of stream operators are also possible.

In embodiments, a threshold rate for utilization may be determined at block 837. The determining may be based on a set of upstream operator data of an upstream operator of the set of stream operators. The determining may occur to configure the window in the stream computing environment to process the stream of tuples. Generally, determining can include calculating, formulating, identifying, resolving, deriving, computing, or otherwise ascertaining the threshold rate based on the set of upstream operator data of an upstream operator of the set of stream operators. In embodiments, determining the threshold rate may include evaluating the set of upstream operator data to ascertain the tuple throughput rate of one or more upstream operators, and subsequently computing a threshold rate based on the tuple throughput rate of the upstream operators. As an example, a set of upstream operator data may be collected that indicates that one or more upstream operators has a tuple throughput rate that is 100 tuples per second slower than other operators of the set of stream operators. Accordingly, a threshold rate may be calculated for one or more stream operators downstream with respect to the set of upstream operators such that windows are maintained open longer (e.g., to accommodate the lower throughput rate of the upstream operators and positively impact the reliability of the set of expected result data). Other methods of determining the threshold rate based on the set of upstream operator data of an upstream operator of the set of stream operators are also possible.

At block 880, the window may be configured in the stream computing environment. The configuring may be based on the confidence factor. The configuring may occur to process the stream of tuples. At block 885, the window may be configured in the stream computing environment. The configuring may be based on a set of operator data of a set of stream operators. The configuring may occur to process the stream of tuples. Method 800 concludes at block 899. Aspects of method 800 may provide performance or efficiency benefits for window management in a stream computing environment. Aspects may save resources such as network bandwidth, storage, processing, or memory.

As described herein, aspects of the disclosure relate to utilizing the techniques and method steps described herein with respect to an event analyzer. Consider the following example. A set of operators in an event analyzer may be configured to receive a set of events (e.g., tuples) having a set of data indicating power-off events for one or more networked hardware devices. As described herein, the set of data of the set of events that correspond to a particular pool (e.g., window) of an operator may be analyzed to determine a confidence factor related to a set of expected result data for the set of events. For instance, in embodiments, the set of data of the set of events may indicate that, in response to a power-off event of a first device, 6 other related hardware devices may also power off, and generate corresponding power-off events. In response to analyzing the set of events, it may be ascertained that the pool has received power off events for the first device and for 4 other related devices. Accordingly, in certain embodiments, a confidence factor of "67" may be determined for a set of expected result data (e.g., at least two other power-off events are expected to be received by the pool). Based on the computed confidence factor, a pool of the event analyzer may be configured. A group of expected events may be (always) expected, and various individual expected events of the group of expected events may or may not happen. In response to the occurrence of the expected events, the confidence factor may reach a threshold which indicates that the pool can be closed. In certain embodiments, a higher confidence threshold may be utilized to facilitate the capture a set of borderline events that may or may not otherwise be captured. Various combinations are possible. For instance, once a threshold of confidence is reached (e.g., expected events have occurred), a rate of change in confidence may be analyzed to determine whether the pool should be held open or closed (e.g., to stay open at least as long as the confidence factor continues to improve). As such, aspects of the disclosure relate to the recognition that, in certain instances, an arrival rate of any event (e.g., including events unrelated to the power event) may keep a pool open. Accordingly, aspects described herein may allow for a pool to close in instances when unrelated events occur. As such, aspects described herein may keep the pool open due to an occurrence of related events which improve the confidence factor. Other methods of managing pools in an event analyzer using the steps described herein are also possible.

Figure 9:
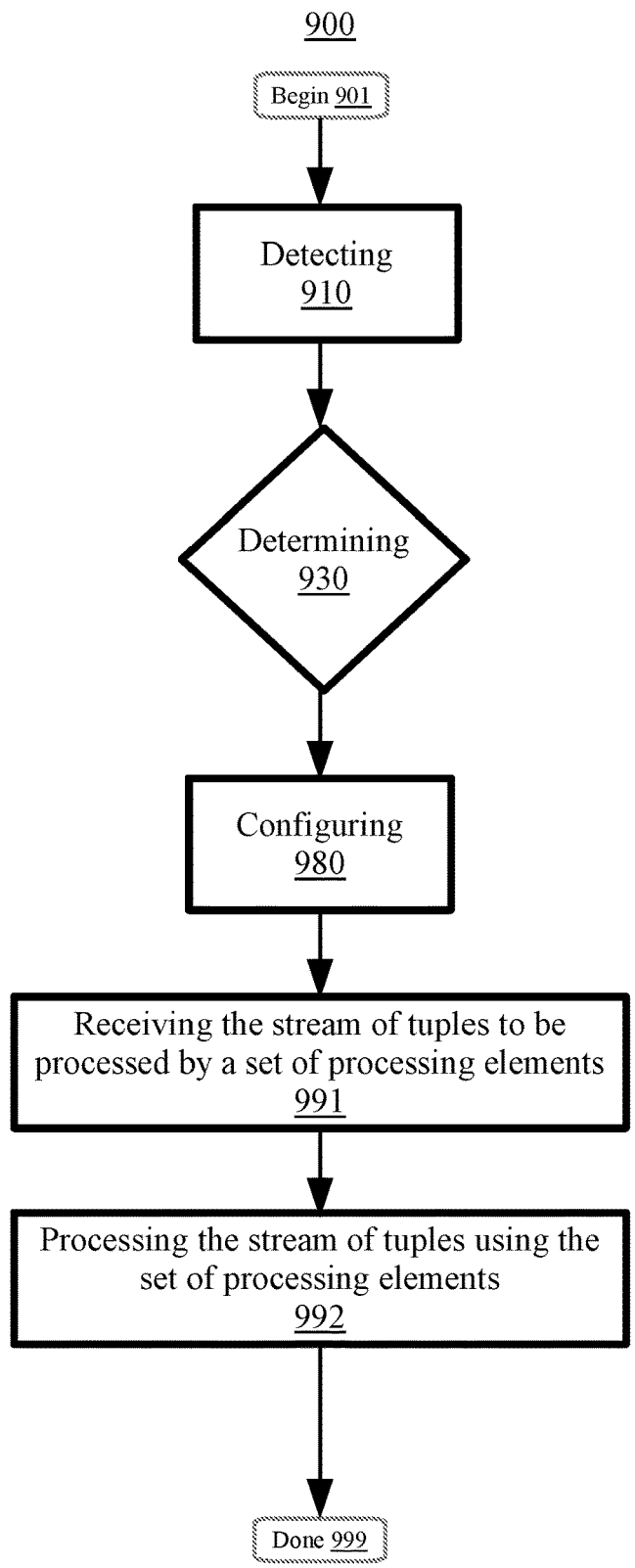
FIG. 9 is a flowchart illustrating a method for window management in a stream computing environment, according to embodiments.

FIG. 9 is a flowchart illustrating a method 900 for window management in a stream computing environment. Aspects of method 900 may be similar to or the same as aspects of method 600/700/800, and aspects may be utilized interchangeably with one or more methodologies described herein. The method 900 may begin at block 901. At block 910, a set of tuples which correspond to the window of the stream computing environment may be detected. The set of tuples may have a set of data. At block 930, a confidence factor related to a set of expected result data for the set of tuples may be determined. The determining may be based on the set of data of the set of tuples. The set of tuples may correspond to the window of the stream computing environment. At block 980, the window may be configured in the stream computing environment. The configuring may be based on the confidence factor. The configuring may occur to process the stream of tuples.

In embodiments, the stream of tuples may be received at block 991. The stream of tuples may be processed by a plurality of processing elements (e.g., stream operators) operating on a set of compute nodes (e.g., in a stream application environment). The stream of tuples may be received consistent with the description herein including FIGS. 1-9. Current/future processing by the plurality of processing elements may be performed consistent with the description herein including FIGS. 1-9. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples may be processed at block 992. The processing may occur using the set of processing elements operating on the set of compute nodes. The stream of tuples may be processed by the plurality of processing elements operating on the set of compute nodes. The stream of tuples may be processed consistent with the description herein including FIGS. 1-9. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 900 concludes at block 999. Aspects of method 900 may provide performance or efficiency benefits for window management in a stream computing environment. Aspects may save resources such as network bandwidth, storage, processing, or memory.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer program product for window management in a stream computing environment, the computer program product comprising a computer readable storage medium having program instructions embodied therewith, wherein the computer readable storage medium is not a transitory signal per se, the program instructions executable by a processor to cause the processor to perform a method comprising:

receiving a stream of tuples to be processed by a set of processing elements which operates on a set of computer nodes;

detecting in real-time a set of tuples that correspond to a window of a stream computing environment, wherein the set of tuples has a set of data;

processing using the set of processing elements on the set of computer nodes the stream of tuples;

determining in real-time based on the set of data of the set of tuples, a confidence factor related to a set of expected result data for the set of tuples that correspond to the window of the stream computing environment;

configuring in real-time, based on a set of operator data of a set of stream operators, the window in the stream computing environment to process the stream of tuples;

determining, based on a set of downstream operator data of a downstream operator of the set of stream operators, a threshold confidence for utilization to configure the window in the stream computing environment to process the stream of tuples;

comparing the confidence factor with the threshold confidence;

resolving that the confidence factor exceeds the threshold confidence; and closing, in response to resolving that the confidence factor exceeds the threshold confidence, the window.

* * * * *